July 12, 1932. D. A. SARGENT 1,867,178
SNOWPLOW EQUIPMENT
Filed Oct. 21, 1930 2 Sheets-Sheet 1

INVENTOR
Don A. Sargent

By Ellis Spear

ATTORNEY.

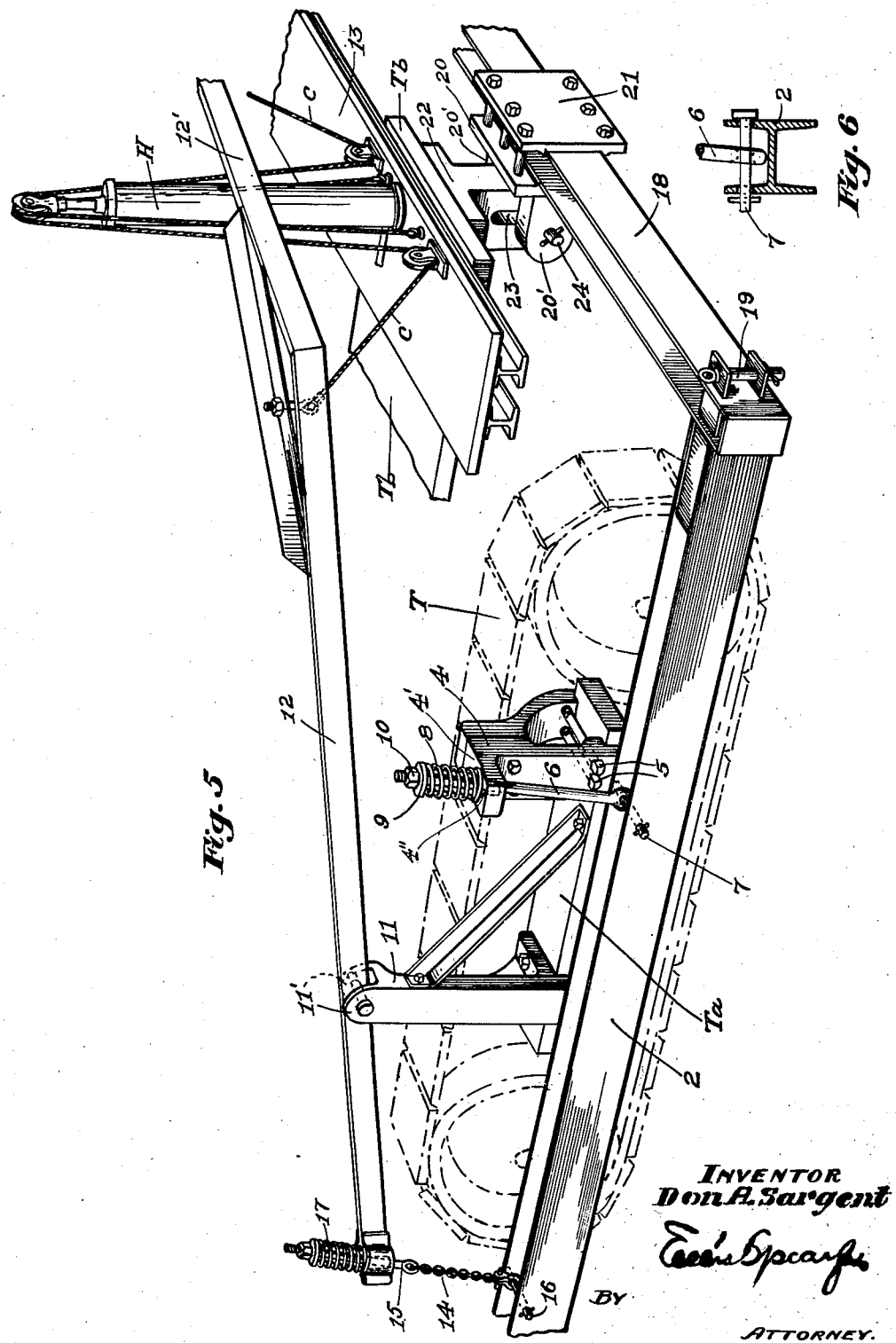

Patented July 12, 1932

1,867,178

UNITED STATES PATENT OFFICE

DON A. SARGENT, OF PORTLAND, MAINE, ASSIGNOR TO MAINE STEEL PRODUCTS COMPANY, OF PORTLAND, MAINE, A CORPORATION OF MAINE

SNOWPLOW EQUIPMENT

Application filed October 21, 1930. Serial No. 490,235.

This invention relates to snow plow or like equipment propelled by a motorized vehicle such as a tractor.

As particularly discussed in this invention I shall consider a tractor-driven snow plow, the tractor being of the so-called "caterpillar" type as such equipment represents a characteristic example of embodiment of the principles involved. The tractor is specifically important because of its power and capability of being easily steered and turned. This is due to its comparatively short tractive base. Unfortunately this feature involves disadvantages when the tractor is operated with a snow plow of the type desired in which the weight of the latter is generally borne by the frame of the tractor. When under strain, the endless tread providing the traction medium, has a tendency to elevate the forward end of the tractor by sudden jerks, causing abrupt rises and falls of the equipment propelled by it. According to the present invention and as herein illustrated, there are four points at which connections are made with the sills, or lower members of the snow plow. The two rearward connecting elements are yieldingly hung from or supported by the chassis frame of the tractor and the two forward connections suspended, also yieldingly, from members pivotally disposed, respectively, on both sides of the snow plow on structures carried on the chassis frame forwardly of the first mentioned connections.

This suspension of the frame is all in advance of the tractive connection as will be pointed out.

The draw-bar of the tractor is attached to the draw-beam of the snow plow in such a manner that no vertical load is carried by the draw-bar—its function being simply to advance or retract the plow when the tractor is operating.

This method of attaching the plow to the tractor accommodates the vibrations and shocks, incident to the continual "bobbing" of the forward end of the tractor upwardly and downwardly, being absorbed by the springs in the respective connections, and enables the operator to control the plow and leave a smoother surface than would otherwise be the case.

Furthermore, by eliminating the positive shock on the four connections when the sudden jolts, occasioned by the vertical movements of the tractor, are applied thereto, the possibility of other connections, both on the tractor and on the plow, becoming loosened or broken is largely done away with.

The invention is illustratively described in the following specification, reference being made to the accompanying drawings in which,—

Fig. 5 is a fragmentary view, in perspective, together with an indicated hydraulic hoisting cylinder employed to operate the nose elevating members, and Fig. 6 is a sectional view through the sill of such a plow showing the connecting element by which it is suspended from the tractor frame.

Like numerals are employed to identify corresponding parts in all views of the drawings.

Figure 1:
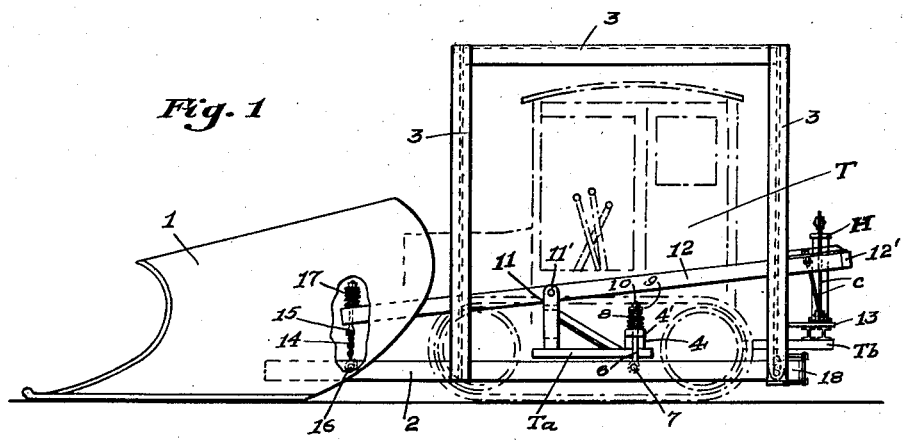
Fig. 1 is a side elevation of a snow plow equipped with apparatus illustrative of the invention involved herein.

Referring to the drawings, the mold boards 1 constitute the nose of the plow, the lower lateral members or sills 2 supporting the super structure 3 of a snow plow frame. The tractor is indicated at T. The wings of the snow plow and the hoists are not shown in the drawings, as not being immediately involved in the invention.

On the portion Ta of the tractor frame is mounted an upright 4, preferably constructed in two parts and clamped over the frame member by means of the bolts 5.

Extending outwardly from the top of the upright is a bracket 4' through an opening 4'' in which is carried a hanger 6. A lifting pin 7 secured in the two webs of the sill 2 (preferably an H beam) engages the eye of the eye-bolt 6 and provides a pivotal connection.

A helical compression spring 8 bears on the bracket 4' and supports the eye-bolt which is capped by the washer 9 and the nut 10. The eye-bolt is of sufficient length to permit of a certain amount of vertical adjustability of the sill, relative to the ground surface.

Located on the same portion, Ta, of the tractor frame and disposed thereon forwardly of the stand 4 is a pedestal bearing 11, between the ears 11' of which is pivotally mounted the lifting frame 12. In Fig. 5 one lateral and the transverse member 12', only, of this frame are shown. In practice, the frame comprises two lateral members 12 connecting, respectively, with the two sills 2 of the snow plow.

The control of the frame is accomplished through the agency of the cables c, c, connecting the rearward portions of the frame with the hydraulic jack H operated by a pump (not shown). The jack H is fixed on the base plate 13 supported on the extended portion Tb of the tractor frame, and in the case of wing-equipped plows there are two more of these jacks, each operating the hoisting gear for the respective wings, and these jacks are arranged, one on each side of the jack H.

The four point suspension in advance of the draw-bar connection not only cradles the plow frame freely on the tractor but assures a control heretofore unknown in such equipment.

At the forward ends of the lifting frame members 12 a construction is employed quite similar in character to that shown at the stand 4 except that, instead of continuing the eye-bolt to the sill, a short section of chain 14 is interposed between the eye-bolt 15 and the forward lifting pins 16 for the purpose of allowing a certain amount of play between the lifting members when the nose of the plow is on the surface of the road-bed. The springs 17 serve for the forward end of the plow when off the ground in the same capacity, as do the springs 8 for the rearward portion, namely, yieldable suspension of the plow structure.

It is a desirable feature in the operation of snow-removing equipment to eliminate, so far as is possible, the longitudinal slackness or "play" between the draft members, especially when the tractor is "backed up" to withdraw the plow from a snow drift.

As the sills of my plow are pivoted on the pins 7, during any vertical movement of the nose of the plow a corresponding movement of less extent and in the opposite direction takes place at the rear end of the sills. This necessitates more or less vertical action between the draft elements and to provide for this, without resort to chains, rods or other mechanism of like character, illustrative draft apparatus depicted on Figs. 3, 4, and 5 of the drawings is shown.

The draw-beam 18 is detachably secured to the ends of the sills—as at 19, and on this beam is a yoked member 20, secured thereon in any approved manner but preferably clamped, as seen at 21. Fixed on the rearward portion Tb of the tractor chassis frame is a draw-bar 22 having therein a vertically disposed slot 23.

Figures 3, 4:
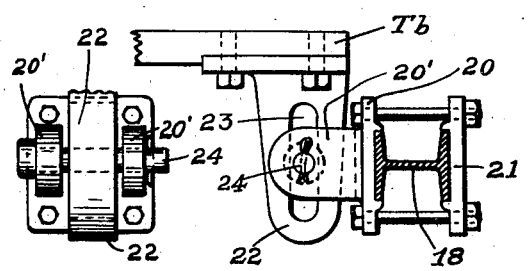
Fig. 3 is a side elevation of the draw-bar and draw-beam connections.
Fig. 4 is a fragmentary end view of Fig. 3.

The draw-pin 24, fixed in the ears 20' of the member 20, passes through the slot 23 loosely, providing for considerable vertical movement with very slight longitudinal lost motion between the parts when the tractor is either advancing or retracting the snow plow, and that as best shown in Fig. 4 there is also capacity for limited side movement between the parts 20 and 22, due to the fact that the member 22 is of less width than the distance separating the ears $20^1$. It will be observed, in this manner of constructing the parts, that no portion of the weight of the snow plow is borne by the tractor, at the draw-bar location.

Figure 2:
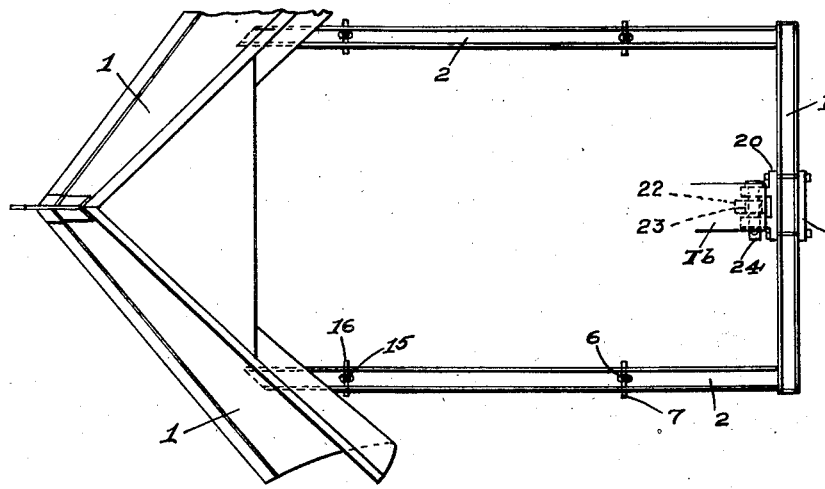
Fig. 2 is a plan view of the same, showing the four points at which connections are made to suspend the sills of the plow.

In Fig. 2 are shown the relative locations of suspension points at which connections are made with the snow plow sills, in advance of the draw-bar connection. The plow is pivotally suspended on the pins 7, where slight vertical movements of the sills take place at this place. The forward portion of the plow is suspended on the pins 16 which in response to the actuation of the lifting frame 12 have a wide range in vertical locations.

While the details shown are of great practical importance, they may be variously modified or combined without departing from the general concept of the invention which is defined in the following claims.

What I therefore claim and desire to secure by Letters Patent is:

1. In a snow plow equipment or the like, a nose member, a frame adapted to receive a tractive vehicle, a draw-bar connection at the rear thereof, means for yieldingly suspending the frame at four points from the vehicle in advance of the draw-bar connection two of said four points of suspension being located at one side of the plow in substantially longitudinal alinement with each other and the other two of said four points of suspension being located at the other side of the plow and in substantially longitudinal alinement with each other substantially opposite said first named pair of suspension points, whereby the entire weight of the plow is symmetrically carried by said tractive device.

2. In a snow plow equipment or the like, a nose member, a frame adapted to receive a tractive vehicle, a vertically movable draw-bar connection at the rear thereof, means for yieldingly suspending the frame at four points from the vehicle in advance of the draw-bar connection two of said four points of suspension being located at one side of the plow in substantially longitudinal alinement with each other and the other two of said four points of suspension being located at the other side of the plow and in substantially longitudinal alinement with each other substantially opposite said first named pair of suspension points, whereby the entire weight of the plow is symmetrically carried by said tractive device, and means to adjust the suspending means.

3. In a snow plow equipment or the like, a main frame adapted to receive a tractive vehicle, a vertically movable draw-bar connection at the rear thereof, a bearing adapted to be supported on the vehicle frame, a lifting frame fulcrumed on said bearing, means for yieldingly suspending the forward portion of the main frame from the forward portion of the lifting frame, and means for yieldingly supporting the rearward portion of the main frame on the vehicle frame rearwardly of the lifting frame fulcrum but in advance of the draw-bar connection.

4. In a snow plow, a nose, side sills connected therewith and spaced to receive a tractive device, a draw-beam connecting the rear ends of said sills, a draw-bar connection for the tractive device, a vertically yielding means for suspending the rearward portion of said sills from the chassis frame of the tractive device, and means to elevate the forward portion of said sills and said nose and yieldingly connected thereto, said elevating means being wholly supported by the chassis frame of said tractor.

5. In a snow plow equipment, a lower frame structure adapted to enclose two sides of a tractive device, yieldable hangers connected at four points with said lower frame structure, two connections being on each side of said plow, and so disposed that the entire weight of said plow is carried by said tractive device, and yieldingly suspended therefrom, pivotal means including two of said yieldable hangers for vertically moving said lower frame structure relatively to that of the tractive device.

6. In a snow plow equipment, frame elements disposable adjacent the two sides of a tractive device, hanger members pivotally connected to said frame elements, means for yieldingly supporting the upper ends of said hanger members on the chassis frame of the tractive device, and a lifting frame, a fulcrum support for the lifting frame and having yielding connections with the said lower frame elements at points located forwardly of the said connected hanger members, said lifting frame being operable to elevate the forward end of the snow plow.

7. In a snow plow equipment, a tractive vehicle, two lateral sills adapted to be disposed at a spaced distance from the ground and located, respectively, outwardly from and adjacent the sides of the tractive vehicle, a stand mounted on the chassis frame on each side of the vehicle, a hanger connected to each of said sills and yieldingly suspended from each of said stands, a pedestal bearing on each side of the vehicle frame, a lifting frame fulcrumed on said pedestal bearings, a yielding connection between the forward ends of said lifting frame and said sills, and means to rock said lifting frame on its fulcrum.

8. In a snow plow equipment or the like, a nose member, a main frame, a tractive vehicle disposed therein, a draw-bar connection at the rear thereof, a lifting frame fulcrumed on the vehicle frame, means for yieldingly suspending the main frame at two points from the vehicle in advance of the draw-bar connection and a yielding connection between the forward end of the lifting frame and the forward end of the main frame.

9. In a snow plow, a pair of side sills spaced apart to enclose a tractive device, a draw bar connection at the rear thereof, means suspending the side sills freely from the tractive device at four spaced points all located in advance of said draw bar connection, and a lifting frame fulcrumed at opposite sides of said sills and at points intermediate of said four points of suspension.

10. In a snow plow, a nose, side sills connected therewith and spaced apart to receive a tractive device, a draw bar connection at the rear ends of said sills, a tractive device enclosed within said sills and having a chassis, two pairs of spaced supporting elements at the sides of said chassis, hangers carried by one pair of said supporting elements in advance of said draw bar connections and connected with said sills, a lifting frame fulcrumed on the other pair of supporting elements at points in advance of said hangers, and hangers carried by said lifting frame and connected to said sills adjacent the forward ends thereof.

In testimony whereof I affix my signature.
DON A. SARGENT.